Figure 1:
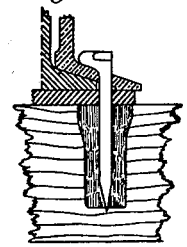

No. 703,780. Patented July 1, 1902.
W. M. FRIDERICIA.
TIE PLUG OR DOWEL.
(Application filed Nov. 12, 1901.)

(No Model.)

a

Witnesses
Thomas Kirkpatrick
H. Van Heerenbrinck

Inventor
William Maurice Fridericia
by Alexanders Co.
Attorneys

THE NORRIS PETERS CO., PHOTO-LITHO., WASHINGTON, D. C.

UNITED STATES PATENT OFFICE.

WILLIAM MAURICE FRIDERICIA, OF COPENHAGEN, DENMARK.

TIE-PLUG OR DOWEL.

SPECIFICATION forming part of Letters Patent No. 703,780, dated July 1, 1902.

Application filed November 12, 1901. Serial No. 82,072. (No model.)

*To all whom it may concern:*

Be it known that I, WILLIAM MAURICE FRIDERICIA, chief clerk of the railway direction, residing at No. 19 Kochsvej, Copenhagen, Denmark, have invented certain new and useful Improvements in Tie-Plugs or Dowels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Wanting to use a sleeper with worn or decayed nail-holes one has hitherto been obliged to introduce into these square wooden dowels the cross-section of which is of about the same size as that of the hook-nail and into which the nails afterward are driven in. The force of adhesion which can be obtained in this way between the hook-nail and the sleeper is relatively a small one and of short duration, because the decayed or crumbling wooden parts around the dowels still are existing as centers of continued decay.

In order to attach rails to sleepers, especially in France, dowels of some hard wood are used, which are screwed into threaded holes through the sleepers. Into these dowels threaded hook-nails are screwed in their turn. This method is used on new sleepers of soft wood as well as in repairing old ones, in which hook-nails cannot be made to stick any more on account of decay in the threaded holes. This arrangement has proved to be rather slow in practice.

The present arrangement regards the use of smooth mainly cylindrical dowels of hard wood for attaching hook-nails to wooden sleepers.

The purpose of the invention is partly to increase the force of adhesion between sleeper and hook-nail, and partly to repair such old sleepers as are no longer available for their purpose on account of wear or decay in the nail-holes.

It is experimentally stated that by employing the present arrangement, according to which smooth mainly cylindrical dowels of hard wood are driven into holes bored in the sleepers, one does not run the risk of cracking the sleeper nor of producing scratches in the same by introducing the hook-nail into the dowel when the cross-section of the latter is but little greater than that of the hole prepared in the sleeper to receive the dowel, and, on the other hand, one obtains a much cheaper and easier attachment of the hook-nail to a sleeper provided with such dowels than would be the case by the use of threaded dowels, and, finally, one obtains a much greater force of adhesion between the hook-nail and the sleeper—one hundred per cent. and more—than is possible by introducing the hook-nail directly into the sleeper as well as a greater force of adhesion than that obtainable by the use of threaded dowels.

As mentioned above, the area of the cross-section of the dowel ought not to be so great in proportion to the hole in which it has to be introduced that it prevents the dowel from being easily driven in without producing any great tension in the sleeper. It is only through the driving in of the hook-nail into the dowel that one ought to obtain the tension necessary to retain the dowel tightly sticking in the sleeper, as well as the wished-for increasing of the friction between the hook-nail and the longitudinal fibers of the dowel. By the present invention one equally prevents the dowel from being pushed down from its position in the sleeper when the hook-nail is forced into it by employing dowels the length of which corresponds to that of the holes, the depth of which is less than the thickness of the sleeper.

Different forms of the invention are shown on the accompanying drawings, where—

Figures 2, 3:
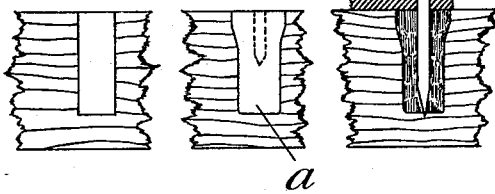
Figure 4:
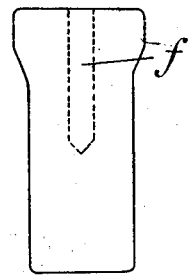
Figure 5:
Figure 6:
Figure 7:

Figure 1 shows one of the holes in the sleepers in longitudinal section; Fig. 2, the same with introduced dowel provided with a head; Fig. 3, the same with hook-nail forced into the dowel, together with rail-foot, bed-plate, and bracket-joint, partially in section; Fig. 4, a side view of a headed dowel on larger scale and a hole bored in the same to receive the nail; Figs. 5, 6, and 7, dowels of different shapes seen from above.

The dowels *a*, (shown in Figs. 2 to 4,) the length of which is about the same as that of the part of the hook-nail which is forced into the sleeper, are headed with a round piece of connection between head and shank. The head gives increased strength to the upper part of the dowel, closes the joint between dowel and sleeper tighter up in order to prevent the introduction of moisture, and keeps the dowel firmly in position when the nail is forced into it. Choosing this form for the head, one avoids every possibility of making scratches in the surface of the sleeper when the dowel is driven in as well as when the nail is forced into the dowel.

Especially when the dowels are used in old sleepers it will prove practical to provide them with a head when the surface of the sleeper may be smoldering, even around the hole in which the dowel shall be placed. The same is the case in sleepers with feeble force of cohesion in the lower surface, in the use of which one runs the risk of cracking the opposite side of the sleeper when forcing the hook-nail into the cylindrical dowel.

The cross-section of the dowel ought, as a rule, to be circular, Fig. 5; but where the cohesive force of the wood is feeble a dowel the shank of which is elliptical or flattened circular in cross-section, but with circular head, can be profitably used, Fig. 6, as well as a dowel with elliptical section of head and shank, Fig. 7. Dowels of these types, Figs. 6 and 7, can easily be driven into the circular holes bored in the sleepers for the dowels. Dowels the length of which corresponds to the thickness of the sleeper or exceeding, but otherwise in form and size of cross-section corresponding to the headed ones described above, can also be used; but the use of them has no effect as regards an increase of the force of adhesion, while the sleeper loses in strength by the perforation. It is in some ways profitable to bore a hole with a diameter of eight to ten millimeters in the dowel through half its length. Especially when forcing the hook-nail into the dowel one will more easily avoid the formation of scratches in the upper part of the dowel when it is provided with such a hole. It shall be pointed out, however, that the formation of small scratches in the dowel that is strongly compressed by the forcing in of the hook-nail does in fact in no way diminish the useful effect of the dowel.

The edge-formed point of the square hook-nail generally in use cuts the fibers of the sleeper when driven directly into the same without employment of dowel, and at the same time it bends the fibers somewhat downward, which is supposed to strengthen the force of adhesion between hook-nail and sleeper a little. By this method, however, there is done violence to the structure of the wooden sleeper, which is to the injury of the durability of the same, and it must therefore be considered more expedient to utilize the friction between the hook-nail and the longitudinal fibers of the dowel for producing the force of adhesion, as it is done in the present arrangement, instead of the friction between the hook-nail and the broken fibers in the nail-hole, as done before, and there are so much stronger reasons to do so, as it has proved to be possible by this new arrangement to obtain a much greater force of adhesion between the hook-nail and the sleeper than that obtainable by former arrangements.

Experiments have shown that the harder the tough wooden material of the dowel is the greater is the force of adhesion between hook-nail and sleeper.

Having thus described my invention, what I claim, and desire to secure by Letters Patent of the United States, is—

1. A wooden tie-plug or dowel comprising a straight body circularly shaped or rounding in cross-section, a similarly-shaped enlarged head concentric with the body and a taper or incline around the plug at the juncture of its head and body; substantially as described.

2. A wooden tie-plug or dowel comprising a straight circular or rounded body, a similarly-shaped enlarged head concentric with the body and a taper or incline around the plug at the juncture of its head and body, the said plug having a bore to receive the spike; substantially as described.

In testimony that I claim the foregoing as my invention I have signed my name in presence of two subscribing witnesses.

WILLIAM MAURICE FRIDERICIA.

Witnesses:
  F. E. WIBERG,
  P. RAIMFELDT.